United States Patent
Yakan

(10) Patent No.: US 8,792,498 B2
(45) Date of Patent: Jul. 29, 2014

(54) SYSTEM AND METHOD FOR ENHANCED UPDATING LAYER-2 BRIDGE ADDRESS TABLE ON ASYMMETRIC MULTIPROCESSING SYSTEMS

(75) Inventor: Medhat R. Yakan, Nepean (CA)

(73) Assignee: Wind River Systems, Inc., Alameda, CA (US)

( * ) Notice: Subject to any disclaimer, the term of this patent is extended or adjusted under 35 U.S.C. 154(b) by 179 days.

(21) Appl. No.: 13/428,114

(22) Filed: Mar. 23, 2012

(65) Prior Publication Data

US 2013/0250965 A1    Sep. 26, 2013

(51) Int. Cl.
*H04L 12/28* (2006.01)
*H04L 12/56* (2006.01)

(52) U.S. Cl.
CPC .................. *H04L 45/021* (2013.01)
USPC ...................... 370/395.31; 370/401

(58) Field of Classification Search
CPC ....... H04L 45/021; H04L 45/42; H04L 45/44; H04L 45/54
USPC .............. 370/252, 412, 395.31, 401
See application file for complete search history.

(56) References Cited

U.S. PATENT DOCUMENTS

| | | | |
|---|---|---|---|
| 2003/0021232 A1* | 1/2003 | Duplaix et al. | 370/238 |
| 2006/0253606 A1* | 11/2006 | Okuno | 709/238 |
| 2012/0275309 A1* | 11/2012 | Jalil | 370/238 |

* cited by examiner

*Primary Examiner* — Kan Yuen
(74) *Attorney, Agent, or Firm* — Fay Kaplun & Marcin, LLP

(57) ABSTRACT

The exemplary embodiments described herein relate to systems and methods for optimizing the aging and learning processes. One embodiment relates to a system comprising a shared memory, a plurality of forwarding cores in communication with the shared memory, wherein each forwarding core includes a local memory, and an arbitrator core in communication with the forwarding cores and the shared memory, wherein the arbitrator core receives forwarding information from a plurality of forwarding cores, wherein each of the forwarding cores includes a local memory storing local forwarding tables, synchronizes the forwarding information from each of the local forwarding tables to generate a temporary working table, sorts the temporary working table into a predetermined array, generates a master forwarding table from the temporary working table, and distributes the master forwarding table to each of the forwarding cores.

17 Claims, 6 Drawing Sheets

FIG. 1

Table 100

| MAC Address | Egress Port | Static (S) | Active (A) | Valid (V) |
|---|---|---|---|---|
| A | 1 | 1 | 0 | 0 |
| B | 2 | 0 | 1 | 1 |
| C | 3 | 0 | 1 | 1 |
| D | 1 | 0 | 0 | 1 |
| . | . | . | . | . |
| . | . | . | . | . |
| . | . | . | . | . |

FIG. 2

Table 200

|  | T0 | | T1⁻ | | T1⁺ | | T2⁻ | | T2⁺ | | T3⁻ | | T3⁺ | | T4 | |
|---|---|---|---|---|---|---|---|---|---|---|---|---|---|---|---|---|
|  | A | V | A | V | A | V | A | V | A | V | A | V | A | V | A | V |
| E1 | 1 | 1 | 1 | 1 | 0 | 1 | 1 | 1 | 0 | 1 | 1 | 1 | 1 | 1 | 1 | 1 |
| E2 | 1 | 1 | 1 | 1 | 0 | 1 | 1 | 1 | 0 | 1 | 0 | 1 | 0 | 0 | X | |
| E3 | 1 | 1 | 1 | 1 | 0 | 1 | 0 | 1 | 0 | 0 | 0 | 0 | X | | X | |

FIG. 4

Table 400

| Core 1 | T0 | | T1⁻ | | T1⁺ | | T2⁻ | | T2⁺ | | T3⁻ | | T3⁺ | | T4 | |
|---|---|---|---|---|---|---|---|---|---|---|---|---|---|---|---|---|
|  | A | V | A | V | A | V | A | V | A | V | A | V | A | V | A | V |
| E1 | 1 | 1 | 1 | 1 | 0 | 1 | 0 | 1 | 0 | 0 | 0 | 0 | X | | X | |
| E2 | 1 | 1 | 1 | 1 | 0 | 1 | 1 | 1 | 0 | 1 | 0 | 1 | 0 | 0 | X | |
| E3 | 1 | 1 | 1 | 1 | 0 | 1 | 1 | 1 | 0 | 1 | 1 | 1 | 0 | 1 | 1 | 1 |
| E4 | X | | X | | X | | X | | X | | X | | X | | 1 | 1 |

FIG. 5

Table 500

| Core 2 | T0 | | T1⁻ | | T1⁺ | | T2⁻ | | T2⁺ | | T3⁻ | | T3⁺ | | T4 | |
|---|---|---|---|---|---|---|---|---|---|---|---|---|---|---|---|---|
|  | A | V | A | V | A | V | A | V | A | V | A | V | A | V | A | V |
| E1 | 1 | 1 | 1 | 1 | 0 | 1 | 1 | 1 | 0 | 1 | 1 | 1 | 0 | 1 | 1 | 1 |
| E2 | 1 | 1 | 1 | 1 | 0 | 1 | 1 | 1 | 0 | 1 | 0 | 1 | 0 | 0 | X | |
| E3 | 1 | 1 | 1 | 1 | 0 | 1 | 0 | 1 | 0 | 0 | 0 | 0 | X | | X | |

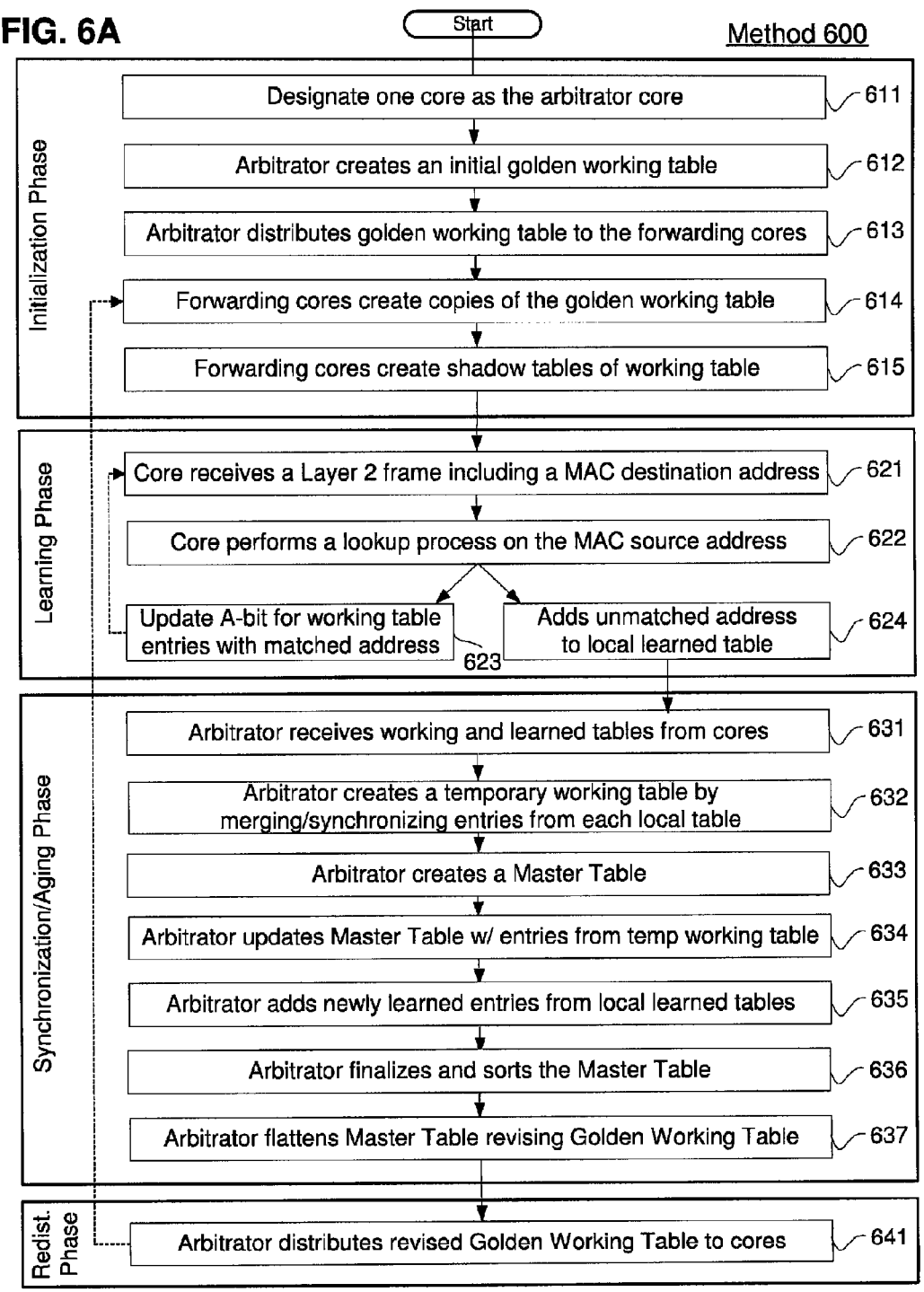

Flow Chart 650

FIG. 7

Table 700

| Core 1/2 | T0 | | T1$^+$ | | T2$^+$ | | T3$^+$ | | T4$^+$ | |
|---|---|---|---|---|---|---|---|---|---|---|
| | A | V | A | V | A | V | A | V | A | V |
| E1 | 1 | 1 | 0 | 1 | 0 | 1 | 0 | 1 | 0 | 1 |
| E2 | 1 | 1 | 0 | 1 | 0 | 1 | 0 | 0 | X | |
| E3 | 1 | 1 | 0 | 1 | 0 | 1 | 0 | 1 | 0 | 1 |
| E4 | X | | X | | X | | X | | 0 | 1 |

SYSTEM AND METHOD FOR ENHANCED UPDATING LAYER-2 BRIDGE ADDRESS TABLE ON ASYMMETRIC MULTIPROCESSING SYSTEMS

BACKGROUND

Within computer networking, bridging is a forwarding technique used in packet-switched networks. Unlike routing, bridging does not make assumptions about where a particular address is located within the network. Instead, bridging depends on flooding and examination of source addresses in received packet headers to locate unknown devices. Once a device has been located, the location of the device is recorded in a table where the source address is stored so as to avoid the need for further flooding. The utility of bridging is limited by its dependence on flooding, and is thus used in local area networks.

A network bridge connects multiple network segments at the data link layer, or "Layer 2," of the Open Systems Interconnection ("OSI") model. Layer 2 bridging is an implementation of IEEE 802.1D transparent bridging that has been used in bridges and Layer 2 switches. Accordingly, a layer 2 bridge is defined as a device that forwards layer 2 frames by matching the destination media access control ("MAC") address of each frame it receives to a destination port as indicated by an entry in its address table. Current implementations of layer 2 bridges rely on learning and aging processes optimized for uni-processor or symmetric multiprocessing ("SMP") systems. However, these implementations do not perform well on asymmetric multiprocessing ("AMP") systems.

SUMMARY OF THE INVENTION

The exemplary embodiments described herein relate to systems and methods for improving the bridging of data over a network. Specifically, the exemplary embodiments relate to systems and methods for optimizing the aging and learning processes. One embodiment relates to a non-transitory computer readable storage medium including a set of instructions executable by a processor, the set of instructions, when executed, resulting in a performance of the following: receiving forwarding information from a plurality of forwarding cores, wherein each of the forwarding cores includes a local memory storing local forwarding tables; synchronizing the forwarding information from each of the local forwarding tables to generate a temporary working table; sorting the temporary working table into a predetermined array; generating a master forwarding table from the temporary working table; and distributing the master forwarding table to each of the forwarding cores.

A further embodiment relates to a system comprising a shared memory, a plurality of forwarding cores in communication with the shared memory, wherein each forwarding core includes a local memory, and an arbitrator core in communication with the forwarding cores and the shared memory, wherein the arbitrator core receives forwarding information from a plurality of forwarding cores, wherein each of the forwarding cores includes a local memory storing local forwarding tables, synchronizes the forwarding information from each of the local forwarding tables to generate a temporary working table, sorts the temporary working table into a predetermined array, generates a master forwarding table from the temporary working table, and distributes the master forwarding table to each of the forwarding cores.

A further embodiment relates to a method of updating an address table comprising receiving forwarding information from a plurality of forwarding cores, wherein each of the forwarding cores includes a local memory storing local forwarding tables, synchronizing the forwarding information from each of the local forwarding tables to generate a temporary working table, sorting the temporary working table into a predetermined array, generating a master forwarding table from the temporary working table, and distributing the master forwarding table to each of the forwarding cores.

BRIEF DESCRIPTION OF THE DRAWINGS

FIG. 1 shows an exemplary embodiment of an address table according to the exemplary embodiments described herein.

FIG. 2 shows an exemplary embodiment of learning and aging updates to address table according to the exemplary embodiments described herein.

FIG. 4 shows an exemplary embodiment of progress to address table of a first core in an AMP system according to the exemplary embodiments described herein.

FIG. 5 shows an exemplary embodiment of progress to address table of a second core in an AMP system according to the exemplary embodiments described herein.

FIG. 6A shows an exemplary embodiment of a method for optimizing the aging and learning processes and the address table update algorithms according to the exemplary embodiments described herein.

FIG. 7 shows an exemplary table resulting from the synchronization of the sample tables for Core 1 (FIG. 4) and Core 2 (FIG. 5) according to the exemplary embodiments described herein.

DETAILED DESCRIPTION

Figure 3:
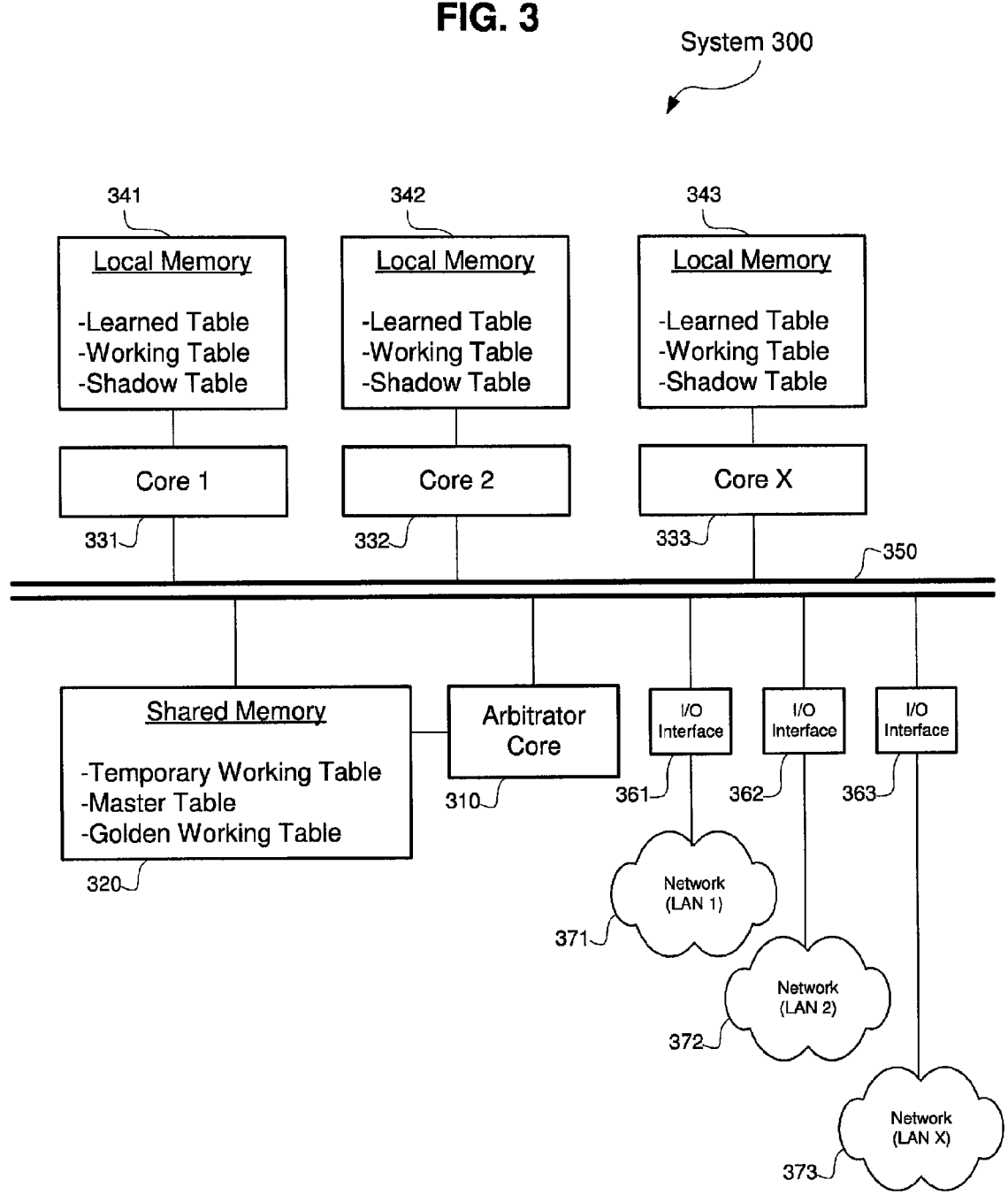
FIG. 3 shows an exemplary embodiment of a system for optimizing the aging and learning processes and the address table update algorithms according to the exemplary embodiments described herein.

The exemplary embodiments may be further understood with reference to the following description and the appended drawings, wherein like elements are referred to with the same reference numerals. The exemplary embodiments described herein relate to systems and methods for improving the bridging of data over a network. Specifically, the exemplary embodiments relate to systems and methods for optimizing the aging and learning processes. Furthermore, exemplary embodiments may also optimize the address table update algorithms to improve Layer 2 Bridge forwarding performance on asymmetric multiprocessing ("AMP") systems.

Conventional Layer 2 bridges rely on learning and aging processes optimized for uni-processor or symmetric multiprocessing ("SMP") systems, but do not perform well on AMP systems. Furthermore, the algorithms used to implement and update the corresponding address tables do not work efficiently on AMP systems. Accordingly, issues such as address table synchronization and optimizing for forwarding performance on performance critical forwarding cores are not properly addressed with exiting designs.

As will be described in greater detail below, the exemplary systems and methods provided herein improve the forwarding performance of a Layer 2 bridge on AMP systems by eliminating the need for the aging process to perform resource intensive operations on the forwarding cores. Instead, this responsibility is transferred to less performance critical control or management cores. The exemplary embodiments also optimize the updates made by the learning process and reduce their impact on the performance of the performance critical lookup process. Furthermore, these exemplary embodiments address the issue of synchronizing the address tables on various cores, as to avoid pruning valid stations or not learning some new stations on certain cores.

With the advent of AMP systems and their added importance in addressing performance critical networking tasks, feature parity is to be maintained with uni-processor counterparts of the AMP system. The use and efficient implementation of Layer 2 bridging is an important feature for the user. The exemplary embodiments described herein provide improvements and additions to existing algorithms to address the challenges particular to AMP systems. It provides a differentiator from the conventional implementations and offers the user a more efficient Layer 2 bridging implementation while maintaining the high performance levels expected from AMP systems.

It should be noted that while the exemplary embodiments are described with reference to an AMP operating system, those skilled in the art will understand that the functionality described herein may be transferred to other types of operating systems. For instance, any type of operating system that supports a multi-processor architecture or multi-instancing of a single processor, such as AMP, symmetric multiprocessing ("SMP"), etc. It should also be noted that the terms "processor" and "CPU" are used interchangeably throughout this description and should be understood to mean any type of computing device that is capable of executing instructions, for example, general purpose processors, embedded processors, digital signal processors ("DSPs"), application specific integrated circuits ("ASICs"), etc.

Throughout this description, hardware operating environments may be described as having multiple CPUs, wherein any given task may have an affinity to one of the CPUs. However, there may be a variety of hardware platforms on which the present invention may be implemented. Specifically, the technique according to the exemplary embodiments may be applied equally to Layer 2 bridging for a multi-CPU target hardware platform, wherein the hardware contains multiple identical CPU processing chips; a multi-core CPU target hardware platform, wherein a single CPU processing chip contains multiple identical processor cores; or a multi-threaded CPU target hardware platform, wherein a single CPU processing chip provides multiple virtual processing elements.

An exemplary Layer 2 bridge may be used to forward data (e.g., Layer 2 frames) between data link layers of two MAC addresses. Specifically, the layer 2 bridge matches the destination MAC address of each frame it receives to a destination port as indicated by an entry in a corresponding address table. The address table may either be populated manually by adding static entries or the table may be updated dynamically by the bridge as it learns of new stations on the attached networks (e.g., local area networks or "LANs"). If a matching entry is not found in the address table, the frame is transmitted, or "flooded," to all ports except the one it arrived on. In order to avoid having the address table grow indefinitely as more stations appear on the LAN, the address table entries need to be aged and eventually deleted when the corresponding stations have not been heard from in a specified amount of time.

In order to achieve this purpose, the Layer 2 bridge may include three processes that run independently, namely, a lookup process, learning process, and an aging process. The lookup process is responsible for querying the address table and matching the MAC destination address of each received frame to a destination port. The lookup process is highly efficient since it operates on every frame. Accordingly, the efficiency of the lookup process affects the overall forwarding performance of the bridge.

The learning process updates the address table once it learns of the existence of new stations on an attached network (e.g., LAN). New stations are detected by inspecting the source MAC address of the frames received by the bridge. Since the frequency at which stations are added to the LAN or moved/removed is usually low (e.g., in the order of hours, days, or even months or years), this process may run at a lower priority than the lookup process. It is acceptable to have short transient times when new stations are available but not yet learned. The learning process also maintains an activity flag for existing stations that is used to make aging decisions.

The aging process runs on a periodic basis and prunes the address table to remove entries for stations that have not been heard from for some specified time (e.g., have not transmitted anything through the bridge). This process runs on an infrequent basis, such as in the order of minutes, and is usually of lower priority than the other processes since delays in aging entries does not have as much impact on the overall performance.

Due to the high priority of the lookup process, the operations performed by the learning and aging processes should have minimal impact on the performance of the lookup process. Conventional implementations of the lookup and learning processes may use efficient algorithms for searching and adding entries to the address table. For instance, one algorithm used may be a sorted list (e.g., sorted by MAC address) combined with a binary search algorithm for lookups, insertion, and deletions, such as the table 100 depicted in FIG. 1. This is a very efficient algorithm for the lookup process to find entries in the table. The algorithm also enables the learning process to add entries fairly quickly, while optimizing memory usage.

However, sharing the same table between the lookup and learning processes would significantly impact the performance of the lookup process due to contention and mutual exclusion restrictions. For this reason, an efficient implementation may actually use multiple address table copies. These multiple tables may include a working copy that is updated by the learning and aging processes, and a shadow copy that is used by the lookup process. When an update cycle is complete, the working and shadow copy pointers may be swapped, thereby having minimal impact on the lookup process while providing it with a fresher copy.

While the shadow copy may be a slightly stale copy of the working copy, the impact of this is minimal compared to the impact of the learning and aging processes constantly updating a common table. In addition, in order to support aging, the address table 100 is organized as depicted in FIG. 1. Each entry in the address table 100 consists of a (destination) MAC address and an egress port, in addition to three control bits: the static bit (S), the active bit (A) and the valid bit (V). It should be understood that the exemplary table entries may include further fields in addition to those described above.

These control bits may be used by the aging process to track the corresponding table entries and to determine whether entries need to be kept or deleted. In addition, the control bits may also be updated by the learning process. However, The control bits are not used at all by the lookup process.

The (S) control bit is set when static entries are added manually to the address table. This bit is cleared for all other dynamic entries. Table entries with the (S) bit set are excluded from the operations performed by the learning and aging processes.

The (A) bit is set by the learning process, initially for newly added entries and also for existing entries when the corresponding station is detected on the attached LAN (e.g., a frame is received with the corresponding MAC source address). This bit is cleared by the aging process each time an aging period elapses. Thus, stations that have been active within the last aging period would have their (A) bit set when the aging process runs. Stations that have not been active within the last aging period would have their (A) bit cleared.

The (V) bit is set initially by the learning process for newly added entries, and is cleared by aging process whenever it encounters an entry with the (A) bit cleared. When the aging process encounters an entry whose (V) bit is already cleared, that means the (A) bit has not been set for the past two aging cycles. Consequently the entry is considered aged and thus removed from the table.

FIG. 2 provides an example of the progression table 200 in which the address table 100 of FIG. 1 may go through over time while the aging and learning processes run. It should be noted that the static entries are not included in this stable since their existence is irrelevant to the operation of the learning and aging processes in this example.

In the example progression table 200 depicted in FIG. 2, there are three entries in the table at time T0, namely, E1, E2, and E3. Each of these entries has an initial state of Active and Valid. The aging process runs in a cycle every T minutes at intervals T1, T2, T3, etc. The T1$^-$ column indicates the state of the table just before the T1 aging process ran, and the state of all entries is unchanged from their initial T0 state at that point. Column T1$^+$ indicates the state of the table just after the T1 aging process ran. It should be noted that the aging process clears all (A) bits.

It may be assumed that between T1 and T2, both E1 and E2 were detected within an attached LAN (e.g., traffic received from them on a bridge interface), but E3 was not detected. Thus at T2$^-$, the (A) bit is set again by the learning process for both E1 and E2 (as indicated by the underlined), but is still cleared for E3. After the aging process runs at T2$^+$, all set (A) bits will be cleared. In addition, since the (A) bit was already cleared for E3, the (V) bit also has been cleared. Accordingly, the entry will eventually be deleted as indicated by the X marker in subsequent intervals. For this example, it may be assumed that E3 was not redetected later on.

Now it may be assumed that between T2 and T3, E1 was detected on the attached networks (e.g., LANs), but E2 was not detected. Thus at T3$^-$, the (A) bit is set again for E1 (underlined), but still cleared for E2. After the aging process runs at T3$^+$, all set (A) bits will be cleared. In addition, since the (A) bit was cleared for E2, the (V) bit was also cleared. Accordingly, the entry will eventually be deleted as indicated by the X marker in subsequent intervals.

Furthermore, it should be noted that although the tables are depicted as contiguous memory structures in the examples provided, the actual implementation may not be as such. For an efficient insertion algorithm (e.g., by the learning process) and deletion (e.g., by the aging process), the table entries should be dynamically allocated structures organized as linked list or binary trees or the like.

FIG. 3 shows an exemplary embodiment of an AMP system 300 optimizing the aging and learning processes and the address table update algorithms according to the exemplary embodiments described herein. The system 300 may include an arbitrator core (or arbitrator 310), a shared memory 320, a plurality of individual forwarding cores 331-333, a plurality of local memories 341-343, a bus 350 and multiple input/output interfaces 361-363 connecting to a set of networks (e.g., LANs 371-373). Each of the cores 331-333 may be in communication with one of a corresponding local memory 341-343, as well as the shared memory 320. Furthermore, each of the local memories 341-343 may include a plurality of address tables, such as learned tables, working tables and shadow tables.

The arbitrator 310 may be described as the central part of a network for providing data and synchronizing the tables throughout the system 300. The individual forwarding cores 331-333 may be described as components in communication with the arbitrator 310 for providing decision-based forwarding, information of data packets over the system 300. Specifically, when any one of forwarding cores 331-333 receives a data packet, that forwarding core may retrieve forwarding information from the packet in the form of a destination address. Accordingly, this forwarding core may utilize a local forwarding table to determine the best match between the destination MAC address of the packet and one of the network addresses stored in the forwarding table. Once a match is found, the packet is transmitted to one of the output interface 361-363. It should be noted that while FIG. 3 illustrates the usage of three forwarding cores 331-333, one skilled in the art would understand that any number of individual forwarding cores may be implemented within the system 300.

Applying the above-described algorithms to an exemplary AMP system 300 is a bit more complicated. The basic concept of having two tables (e.g., a working table and a shadow table) will still work the same way on each of the cores. The handling of the lookup process in an AMP environment may be simple. For instance, either all cores 331-333 can share a single common shadow table stored in the shared memory 320, or each core will have its own copy of the shadow table in its local memory 341-343. All shadow copies may be identical on all cores at any point in time. One exception may be when using independent local shadow tables in local memory where possibly for a very short and insignificant amount of time, the tables may not be identical while some cores are still getting the updated shadow table copy. Since the lookup process performs read-only operations, the exemplary AMP system 300 presents no challenges or performance bottlenecks specific to this implementation.

Where the above-described implementations fall short in an AMP environment is in the way the learning and aging processes are handled, as well as in how the shadow and working tables are updated. Since each of the cores 331-333 may operate on its own traffic flows independent of other cores, some cores may learn about certain stations (e.g., receive frames from those stations), while other cores may never see any traffic from those stations. Thus the working table copies that are being updated independently on each of the cores will not be identical most of the time. The tables 400 and 500 of FIGS. 4 and 5, respectfully, illustrate this discrepancy on a dual core system, wherein table 400 related to Core 1 and table 500 relates to Core 2.

This presents an issue when the shadow and working table pointers need to be swapped. If this is done independently on each of the cores 331-333, then some cores may age certain entries while, in fact, other cores still have them as active. Furthermore, the shadow tables will not be identical on all cores, thereby causing problems. It should be noted that columns T2$^+$, T3$^+$, and T4 differ in the Core 1 and Core 2 tables. Also it should be noted that entry E4 is only known on Core 1. This is result in the working tables if the cores updated their tables independently, creating inconsistency in the bridge forwarding logic between each core.

Thus, the exemplary systems and methods described herein may synchronize all the working table copies on all the cores 331-333, before the shadow and working table pointers can be swapped for each of those cores. Accordingly, all of the cores 331-333 may have identical shadow copies in order to make consistent forwarding decisions.

In addition, the implementation of the working table may be geared towards efficient addition and deletion by the learning and aging processes respectively. This is something that is not necessarily the same on AMP systems, such as system 300. Thus further optimizations may also be achieved in this area.

As noted above, the exemplary systems and methods provides an improved and more efficient algorithm for handling the AMP case while ensuring that the exemplary working table copies on all of the cores 331-333 are "in sync" before the working and shadow table pointers are swapped. In order to provide this efficient algorithm, especially in the case when large numbers of entries are maintained per table, the basic algorithm for learning and aging will be modified in accordance with any number of principles, including, but not limited to the following:

1) In addition to the shadow and working tables maintained on each core 331-333, a new learned table may also be maintained within the corresponding local memories 341-343. As will be described in greater detail, the new learned tables may include entries for any unmatched forwarding information (e.g., MAC destination address) during the lookup process at each core.

2) The learning process on each core may only update the (A) bits in its working table, and may only add new entries in the learned table, if they do not already exist in the working table. This approach improves the efficiency of lookups and updates in the working table, which may be a more frequent operation than adding new entries. In most instances, stations may be added or moved at a much lower rate than frames are received.

3) The aging process may no longer run on the individual forwarding cores 331-333. Instead, the aging process may run on the arbitrator core 310 and may perform its less critical aging operations there. The forwarding cores 331-333 may be provided with the latest working Table copy at the end of each aging cycle.

4) As a consequence of not running an aging process on forwarding cores 331-333, there is no any need for them to delete entries from their own working table. Also since a separate learned table is maintained for adding new entries, entries are not added to the working table either. Thus, the working table can be implemented as a simple binary-sorted array of entries, as opposed to a more complicated structure, such as a linked list or binary tree. Accordingly, the access speed for the learning process may be improved. Additionally, the shadow table, which is a copy of the working table, may also be a simple linear array that improves the efficiency of the lookup process. It should be noted that the working table may be pre-sorted by the aging process before it is supplied to the individual forwarding cores. Therefore, the forwarding cores do not incur the cost of sorting those arrays.

5) The learned table may be implemented in an efficient way for lookup, an operation that may be required for every received frame having MAC source address that is not found in the working table. However, since additions may be less frequent, the addition algorithm may also be less efficient. Consequently, the learned table may be implemented as a simple sorted array, instead of more complex linked list or binary tree implementation. Thus, lookup performance may be improved at the expense of the occasional insertion overhead.

The addition of a learned table has minimal impact on the performance-critical lookup process since the latter uses the shadow table that is not modified during the learning process operations, nor is it a contended resource that needs to be protected. Only the value of the pointer to the shadow table would be changed once the working table is updated. This pointer is the only resource that needs to be protected. The only impact may occur when the learning process consumes processor cycles to add entries to the learned table. This occurrence is an infrequent and usually fast operation. One exception may be when many new stations appear on the network in a very short period of time. For example, upon initialization or upon recovery from network errors, both infrequent occurrences at times where it is acceptable to have temporarily sub-optimal forwarding performance.

According to the exemplary embodiments described herein, the proposed algorithm operates may be divided into phases to allow for a simpler understanding of the progression. These phases may include an initialization phase, a learning phase, a synchronization/aging phase, and a redistribution phase.

FIG. 6A shows an exemplary embodiment of a method 600 for offering wire-rate on multiple links with guaranteed packet order according to the exemplary embodiments described herein. It should be noted that the exemplary method 600 will be discussed with reference to the arbitrator 310 and the system 300 of FIG. 3.

The method 600 may allow for a system having a plurality of processors (e.g., a multi-core AMP system) to optimize the aging and learning processes of address tables to improve Layer 2 Bridge forwarding performance. Therefore, using the exemplary system 300 described above, the method 600 may remove the resource-intensive aging process from the exemplary forwarding cores 331-333 within the system 300, and transfer this responsibility to less performance-critical control, such as to the arbitrator core 310.

Initialization Phase

Steps 611-615 of the exemplary method 600 may be designated as the Initialization Phase. In step 611, an arbitrator core may be designated, such as arbitrator 310. Specifically, the arbitrator 310 may be assigned responsibility to synchronize the working tables, run the aging process and distribute the working tables to the individual cores 331-333. Various implementations may either choose one of the existing forwarding cores 331-333 as an arbitrator. In a preferred embodiment, the role may be assigned to a control or management core that does not run the bridge lookup and learning processes. The choice of either of these approaches is inconsequential to exemplary method 600, as long as the arbitrator role is maintained independently from the learning and lookup roles. It may be noted that although the exemplary systems and methods allow for the arbitrator role to be shared on a forwarding core, one benefit of using the control or management would be in offloading of the arbitrator role from any of the individual forwarding cores 331-333.

In step 612, the arbitrator 310 may create an initial "golden" working table. Initially, the arbitrator 310 may either have empty tables, or tables with static entries based on a system configuration. In the former case, the working table may be created as an empty array. In the latter case, the arbitrator 310 may create a binary-sorted master table. If applicable, the arbitrator 310 may flatten the master table into a linear array structure representing the "golden" working table. The flattening step may be skipped if the master table implementation uses a linear sorted array. Otherwise the flattening step may be implemented if more complex implementations are used, such as linked lists or binary trees.

In step 613, the "golden" working table may be distributed to the individual forwarding cores 331-333. An exemplary distribution mechanism may be implementation specific. For example, the arbitrator 310 may pass a pointer to the shared memory region 320, wherein each of the cores 331-333 may access.

In step 614, each of the cores 331-333 may then use the pointer to create their own working table copy of the "golden" working table. In one embodiment, the cores 331-333 may share a single shadow table copy in the shared memory 320. Therefore, the pointer passed by the arbitrator 310 may be that of the shared shadow table. Alternately, the arbitrator 310 may distribute a copy to each core upon initialization, such as via messaging or direct copy into the local memory 341-343 of each core 331-333. The specific implementation mechanism used is inconsequential to exemplary systems and methods described herein, as long as each of the cores 331-333 creates a working table copy identical to the arbitrator's "golden" working table.

In step 615, each of the cores 331-333 may create a shadow table of the working table copy. If a single shadow table is shared among all of the cores 331-333, then the arbitrator 310 may distribute a pointer to that table to each of the cores 331-333. Otherwise, if each core maintains its own shadow table, then this table can be initially set up as a replica of the initial working table. Alternatively, the first working table may be considered to be a copy of the initial shadow table.

In the embodiments wherein the cores are individually brought up or rebooted some considerable time after initial system boot-up, the arbitrator may distribute the most recent copy of the "golden" working table to the newly initialized core. When a common shadow table copy is used, then the newly initialized core may simply initialize its working table from that copy after the arbitrator passes it the shared shadow table pointer.

It should be noted that the forwarding process may run as usual using the shadow copy, matching destination addresses to entries in the shadow copy and forwarding or flooding accordingly. The forwarding process would not be impacted by any of the various phases described here in method 600.

Learning Phase

Steps 621-624 of the exemplary method 600 may be designated as the Learning Phase. According to the exemplary embodiments, the learning processes may perform as they would normally do on each of the individual cores 331-333. Thus, the (A) bits in the working table may be updated for each active station as described in the previous sections. However, as detailed above, the individual cores 331-333 may be precluded from deleting or adding an entry in their corresponding working table.

In step 621, an individual core receives a data packet, such as a Layer 2 frame having a MAC destination address. In step 622, the core performs a lookup process to match the source address with that of an entry in its working table. If the source address matches an entry in the table, in step 623, the core sets the A bit in the working table accordingly and the method 600 returns to step 621 for a further data packet (e.g., Layer 2 frame). If an entry is not found in the working table, in step 624, the core may add the information to its learned table, and method 600 may advance to the Synchronization and Aging Phase. Accordingly, new entries may be added to the learned table on each individual core if they are detected but not found within the working table.

Synchronization and Aging Phase

Figure 6B:
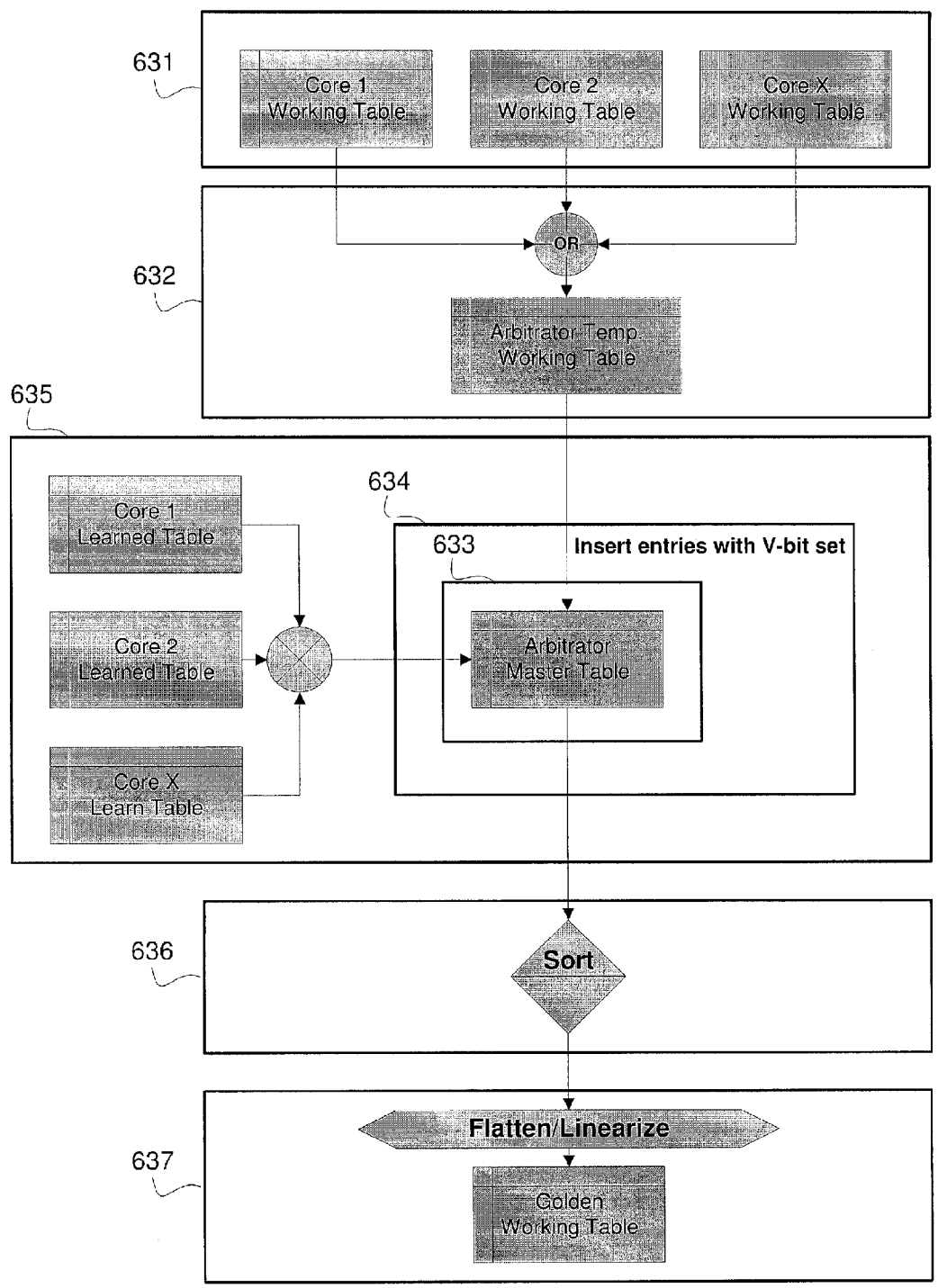
FIG. 6B shows a corresponding flow chart of the synchronization phase described in the method (FIG. 6A) for optimizing the aging and learning processes and the address table update algorithms according to the exemplary embodiments described herein.

Steps 631-637 of the exemplary method 600 may be designated as the Synchronization and Aging Phase. FIG. 6B shows a corresponding flow chart 650 of the synchronization phase (steps 631-637) described in the method 600 of FIG. 6A for optimizing the aging and learning processes and the address table update algorithms according to the exemplary embodiments described herein According to the exemplary method 600, the arbitrator 310 may include an aging timer. When the aging timer is triggered, in step 631, the arbitrator 310 may retrieve a copy of the working and learned tables from each of the cores. This action may be performed as frequently as the aging process runs, which is in the order of minutes and thus has minimal impact on performance. The retrieval method may be implementation-specific. The arbitrator 310 may be able to "snoop" the contents of the working and learned tables of each core, or may need to request a copy. During retrieval, the system may take steps to ensure that the individual cores are not in the process of updating those tables that are to be retrieved. As this mechanism is implementation-specific, it is inconsequential to this exemplary method 600, as long as the arbitrator 310 receives a consistent copy of each entry in those tables. It may be permissible of the arbitrator 310 receives a slightly older copy of some entries versus others.

In steps 632-635, the arbitrator may then start a working table synchronization process. In step 632, the arbitrator creates one iterator for the working table of each individual core. The arbitrator may then read one entry at a time from each working table and logically "ORs" (e.g., applies an OR operation to) its control bits with the corresponding entries for each of the other cores. Since the entries in all of the working tables may be aligned, the "OR-ing" operation essentially synchronizes all the entries from all of the working tables. The result may be stored in a temporary working table, which may be an independently allocated table or one of the existing working table copies of the cores (e.g., simply the first one).

In step 633, a master table may be created. This step may be implemented in a way that allows easy addition and sorting. The manner in which the master table is implemented may require at least two conditions. A first condition may allow for arbitrary entries to be added to the table in a reasonably efficient manner. This condition does not need to have optimal efficiency, just efficient enough as to not consume too many resources or too much time. A condition may allow for the resulting table to be sorted by MAC address at the end of the operation.

In step 634, the master table may be updated with entries from the synchronized temporary working table. According to the exemplary embodiment, the synchronized temporary working table may be iterated, and each entry whose (V) bit is set may be added to the master table. Entries whose (V) bit is cleared may be skipped, effectively deleting them and pruning the address table.

In step 635, the newly learned entries may be added to the master table. Specifically, the arbitrator may retrieve entries from the learned table of each core and adds those entries to the master table, while avoiding duplication and ensuring the (A) and (V) bits are both set.

At the end of the working table synchronization operation, in step 636, the master table now contains an up-to-date synchronized copy of all working tables and learned tables from each of the individual cores. Furthermore, the master table should now be sorted. It should be noted that there may be a slight difference due to the fact the tables on certain cores may have changed since the time they were queried by the arbitrator. However, such a difference may be minimal.

In step 637, the master table may then be flattened to a working table implemented as a linear array structure. This step creates a revised "golden" working table. Depending on implementation process, this step may be skipped if the master table is already implemented as a linear array since the master table and "golden" working table would be identical to one another.

Redistribution Phase

Step 641 of the exemplary method 600 may be designated as the Redistribution Phase. In step 641, the arbitrator 310 may distribute the revised "golden" working table to each of the individual cores 331-333 of the exemplary system 300. The mechanism used to perform this step depends on the implementation of the embodiment. For instance, if a shared shadow table is used by all of the cores 331-333, then the arbitrator 310 may simply change the shadow table pointer to point to point to the "golden" working table. An in-band indication may be added to the table to inform each core that it has changed (e.g., via a bit-mask). Therefore, the next time each core accesses the table, that core may use that indication to recreate its own working table (e.g., make a new copy from the shadow table), and clear its learned table. It should be noted that the indication may be reset by the core, so that the core does not accidentally repeat this on subsequent accesses. Alternately, an out-of-band indication may be sent (e.g., via interrupt, doorbell, messaging or other mechanism) to each of the cores in order to inform the cores that the shadow table has changed.

Alternatively, if each of the cores maintains its own copy of the shadow table, then the arbitrator may distribute the "golden" working table to each core, such as via shared memory, by directly copying it to the local memory of the core, via messaging, etc. The individual cores may then swap their individual shadow table pointer to point to their new working table. Thus, the working table pointer may point to the old shadow table that will be updated with the newest table copy, which is now the Shadow Table). In addition, the learned table may also be reset.

Regardless of the implementation used by the system, each of the individual cores may end up with a shadow table and a working table identical to the latest "golden" working table, and will have an empty learned table. The learning process may then proceed as usual to updating the working and learned tables, thereby returning the method 600 to steps 621-624 discussed above. As noted above, the forwarding process is not impacted by the method 600 and may continue to make forwarding decisions using the shadow table.

FIG. 7 shows an exemplary table 700 resulting from the synchronization of the sample tables for Core 1 (table 400 of FIG. 4) and Core 2 (table 500 from FIG. 5). As depicted in table 700, the progress of the synchronization is apparent at intervals from T0 to T4$^+$.

For further optimization, the learned table polling period may be optionally configured to be different than the aging period. For example, learned table polling period may be shorter for more dynamic networks so that new entries may be learned and added more quickly. Conversely, the learned table polling period may be longer for more static networks where new stations are added/moved very infrequently.

The implications of a shorter learning period is that the overhead of recreating the working tables on the individual forwarding cores more frequently may offset any benefit of learning new entries earlier. Thus, it may be advantageous for the interval to be long enough as not to impact performance in any significant way (e.g., in the order of minutes).

One consequence of making the learning period longer than the aging period may be the unintended deletion of a station. For instance, if one or more stations go inactive (e.g., not transmitting), then these stations may be aged and thus be deleted from the shadow tables. Accordingly, these stations will not be relearned until the next time a learning process runs. If such stations still have traffic directed to them, then any gains achieved by reducing the learning period may be offset by the performance penalties of those entries being absent from the address tables.

To summarize the exemplary systems and methods described herein, a plurality of individual forwarding cores may maintain at least three local tables: 1) a shadow table used by the lookup process to make forwarding decisions; 2) a working table updated by the learning process to indicate active stations; and 3) a learned table used by the learning process to add newly learned stations.

As opposed to the aging process running on the performance critical forwarding cores 331-333, the aging process may run on the arbitrator 310, outside the performance critical constraints. When the aging process runs on a periodic basis (e.g., in the order of minutes), the arbitrator 310 may retrieve the various working and learned tables from the individual cores 331-333.

Furthermore, the arbitrator 310 may synchronize and sort these local tables, then distribute the resulting master table to the individual forwarding cores 331-333. The tables may be retrieved and distributed in an efficient manner as to minimize the impact on the performance critical lookup process and forwarding operation. According to the exemplary embodiments described herein, the shadow table may be maintained as a "read-only" table, wherein the entries do not need to be protected from multiple accesses via mutual exclusion mechanisms.

The table implementations may be geared towards the most efficient operation by the processes that use them. Thus, these implementations are optimized for the more frequent lookup and update operations, rather than the less frequent addition and deletion operations.

As described above, these exemplary systems and methods enhance the performance of a Layer 2 bridge on an AMP system in any number of ways. For instance, in maintaining the shadow table approach, any impact to the lookup process is very minimal and may be limited to only shadow and working table pointers are swapped. Thus, forwarding performance is optimized. A further enhancement would be the simplified implementation of the working and learned tables on forwarding cores, wherein the time needed to update or add entries is minimized. Less time is used for performing these operations on the forwarding cores, and thus their performance is optimized.

Another enhancement would be that the arbitration mechanism maintains a synchronization of the address tables on the various cores. The arbitration mechanism ensures that flooding due to missing entries is minimized and aging decisions are not done erroneously. Furthermore, the rather time intensive synchronization mechanism is offloaded from the performance sensitive forwarding cores, to the less real time critical control or management cores. Thus, again, optimizing forwarding performance. It should be noted that the numerous benefits and enhancement provided by the invention are not limited to the only those discussed above.

Those skilled in the art will understand that the above described exemplary embodiments may be implemented in any number of manners, including, as a separate software module, as a combination of hardware and software, etc. For example, the exemplary systems and methods may be implemented within a program containing lines of code stored in any type of non-transitory computer-readable storage medium that, when compiled, may be executed by a processor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer readable storage medium including a set of instructions executable by a processor, the set of instructions, when executed, resulting in a performance of the following:
   receiving forwarding information from a plurality of forwarding cores, wherein each of the forwarding cores includes a local memory storing local forwarding tables;
   synchronizing the forwarding information from each of the local forwarding tables to generate a temporary working table;
   sorting the temporary working table into a predetermined array;
   generating a master forwarding table from the temporary working table;
   distributing the master forwarding table to each of the forwarding cores;
   receiving a data packet including further forwarding information at one of the plurality of forwarding cores, each of the forwarding cores including a local memory;
   matching the further forwarding information within a working table in the local memory; and
   creating an entry within a learned table in the local memory for unmatched further forwarding information.

2. The non-transitory computer readable storage medium of claim 1, wherein the distribution of the master forwarding table includes one of transmitting a pointer to a region within the shared memory and transmitting a direct copy of the master forwarding table to each of the local memories.

3. The non-transitory computer readable storage medium of claim 1, wherein the execution of the set of instructions further results in the performance of the following:
   receiving data of a local learned table from at least one of the plurality of forwarding cores; and
   updating the master forwarding table within the shared memory.

4. The non-transitory computer readable storage medium of claim 3, wherein the execution of the set of instructions further results in the performance of the following:
   distributing the updated master table to each of the plurality of forwarding cores.

5. The non-transitory computer readable storage medium of claim 1, wherein the execution of the set of instructions further results in the performance of the following:
   designating one of the plurality of forwarding cores as an arbitrator core; and
   precluding the undesignated forwarding cores from performing an aging process on local forwarding tables.

6. A system, comprising:
   a shared memory;
   a plurality of forwarding cores in communication with the shared memory, wherein each forwarding core includes a local memory; and
   an arbitrator core in communication with the forwarding cores and the shared memory, wherein the arbitrator core receives forwarding information from a plurality of forwarding cores, wherein each of the forwarding cores includes a local memory storing local forwarding tables, synchronizes the forwarding information from each of the local forwarding tables to generate a temporary working table, sorts the temporary working table into a predetermined array, generates a master forwarding table from the temporary working table, and distributes the master forwarding table to each of the forwarding cores,
   wherein at least one of the forwarding cores receives a data packet including further forwarding information at one of the plurality of forwarding cores, each of the forwarding cores including a local memory, matches the further forwarding information within a working table in the local memory, and creates an entry within a learned table in the local memory for unmatched further forwarding information.

7. The system of claim 6, wherein the distribution of the master forwarding table includes one of transmitting a pointer to a region within the shared memory and transmitting a direct copy of the master forwarding table to each of the local memories.

8. The system of claim 6, wherein the arbitrator core receives data of a local learned table from at least one of the plurality of forwarding cores and updates the master forwarding table within the shared memory.

9. The system of claim 8, wherein the arbitrator core distributes the updated master table to each of the plurality of forwarding cores.

10. The system of claim 6, wherein one of the plurality of forwarding cores is designated as an arbitrator core and the undesignated forwarding cores are precluded from performing an aging process on local forwarding tables.

11. The system of claim 10, wherein the arbitrator core and the plurality of forwarding cores are components within an asymmetric multiprocessing "AMP" system.

12. A method of updating an address table, comprising:
   receiving forwarding information from a plurality of forwarding cores, wherein each of the forwarding cores includes a local memory storing local forwarding tables;
   synchronizing the forwarding information from each of the local forwarding tables to generate a temporary working table;
   sorting the temporary working table into a predetermined array;
   generating a master forwarding table from the temporary working table; and
   distributing the master forwarding table to each of the forwarding cores,
   wherein at least one of the plurality of forwarding cores receives a data packet including further forwarding information, each of the forwarding cores including a local memory, matches the further forwarding information within a working table in the local memory, and creates an entry within a learned table in the local memory for unmatched further forwarding information.

13. The method of claim 12, wherein the distributing of the master forwarding table includes one of transmitting a pointer to a region within the shared memory and transmitting a direct copy of the master forwarding table to each of the local memories.

14. The method of claim 12, further comprises:
   receives data of a local learned table from at least one of the plurality of forwarding cores; and
   updating the master forwarding table within the shared memory.

15. The method of claim 14, further comprising:
   distributing the updated master table to each of the plurality of forwarding cores.

16. The method of claim 12, further comprising:
  designating one of the plurality of forwarding cores as an arbitrator core; and
  precluding the undesignated forwarding cores from performing an aging process on local forwarding tables.

17. A non-transitory computer readable storage medium including a set of instructions executable by a processor, the set of instructions, when executed, resulting in a performance of the following:
  receiving forwarding information from a plurality of forwarding cores, wherein each of the forwarding cores includes a local memory storing local forwarding tables;
  synchronizing the forwarding information from each of the local forwarding tables to generate a temporary working table;
  sorting the temporary working table into a predetermined array;
  generating a master forwarding table from the temporary working table;
distributing the master forwarding table to each of the forwarding cores;
  designating one of the plurality of forwarding cores as an arbitrator core; and
  precluding the undesignated forwarding cores from performing an aging process on local forwarding tables,
  wherein the arbitrator core and the plurality of forwarding cores are components within an asymmetric multiprocessing "AMP" system.

* * * * *